(12) United States Patent
Hargraves et al.

(10) Patent No.: US 10,371,210 B2
(45) Date of Patent: Aug. 6, 2019

(54) SLINGER FOR ROLLER BEARING SEAL, AND ASSOCIATED ASSEMBLIES AND METHODS

(71) Applicant: Amsted Rail Company, Inc., Chicago, IL (US)

(72) Inventors: James A. Hargraves, Petersburg, VA (US); Michael A. Mason, Petersburg, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 14 days.

(21) Appl. No.: 15/621,898

(22) Filed: Jun. 13, 2017

(65) Prior Publication Data

US 2018/0355918 A1    Dec. 13, 2018

(51) Int. Cl.
| | |
|---|---|
| *F16C 33/76* | (2006.01) |
| *F16C 33/78* | (2006.01) |
| *F16C 33/80* | (2006.01) |
| *F16C 13/00* | (2006.01) |
| *F16J 15/3264* | (2016.01) |
| *F16J 15/447* | (2006.01) |

(52) U.S. Cl.
CPC ........ *F16C 33/7816* (2013.01); *F16C 13/006* (2013.01); *F16C 33/76* (2013.01); *F16C 33/7813* (2013.01); *F16C 33/80* (2013.01); *F16J 15/3264* (2013.01); *F16J 15/4478* (2013.01); *F16C 2326/10* (2013.01)

(58) Field of Classification Search
CPC ...... F16C 33/7816; F16C 33/76; F16C 33/80; F16C 13/006; F16C 2326/10; F16J 15/3264; F16J 15/447; F16J 15/4472; F16J 15/4474; F16J 15/4476; F16J 15/4478
See application file for complete search history.

(56) References Cited

U.S. PATENT DOCUMENTS

| | | | | |
|---|---|---|---|---|
| 1,978,739 | A | * 10/1934 | Brittain, Jr. | ............. B61F 15/22 277/420 |
| 8,356,941 | B2 | * 1/2013 | Mason | ................ F16C 33/7813 384/477 |
| 8,360,651 | B1 | 1/2013 | Fetty et al. | |
| 8,708,571 | B2 | 4/2014 | Kurohara | |
| 8,790,014 | B2 | * 7/2014 | Shimizu | .................. F16C 33/80 384/480 |
| 9,982,719 | B2 | * 5/2018 | Harada | ................. F16C 33/782 |
| 2003/0201609 | A1 | 10/2003 | Hood et al. | |

(Continued)

OTHER PUBLICATIONS

PCT/US2018/037391 International Search Report and Written Opinion dated Aug. 30, 2018, 11 pp.

*Primary Examiner* — Gilbert Y Lee
(74) *Attorney, Agent, or Firm* — Lathrope Gage LLP

(57) ABSTRACT

A slinger for a roller bearing seal includes (a) an inner section extending at least in a first direction parallel to a rotation axis of the slinger, encircling the rotation axis and forming a plurality of tabs configured to pressure fit the slinger onto a rotor of a roller bearing seal, (b) an outer section extending at least in the first direction at a greater distance than the inner section from the rotation axis and encircling the rotation axis, and (c) a middle section encircling the rotation axis and spanning between the inner section and the outer section, wherein the inner section, the middle section, and the outer section define respective portions of a single continuous part.

28 Claims, 15 Drawing Sheets

(56) References Cited

U.S. PATENT DOCUMENTS

2008/0226212 A1 9/2008 Mason et al.
2011/0216993 A1 9/2011 Mason et al.
2017/0335890 A1* 11/2017 Harada ................ F16C 33/782

* cited by examiner

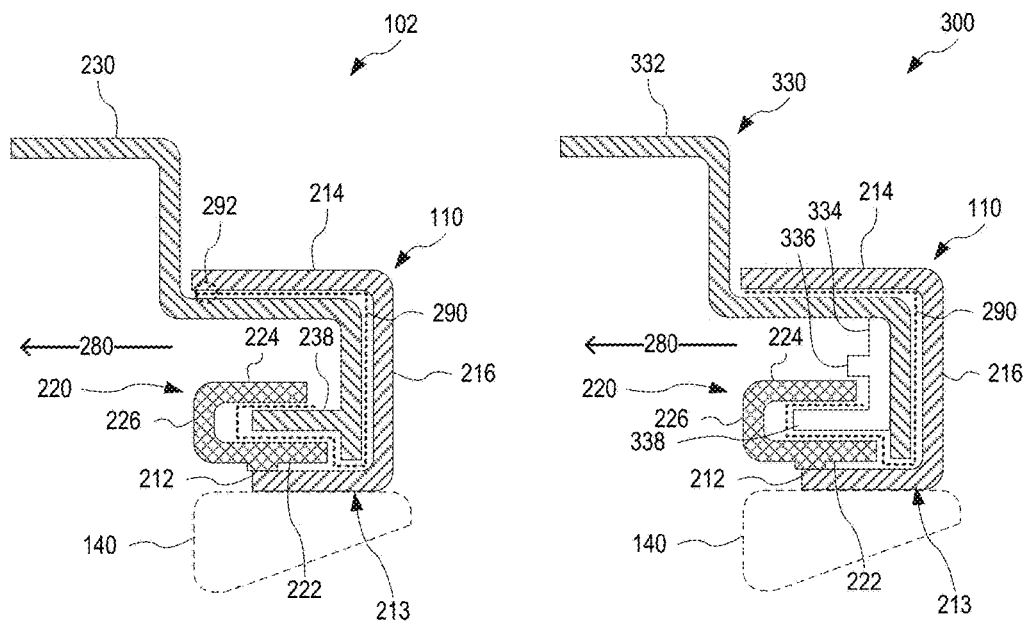
FIG. 2  FIG. 3
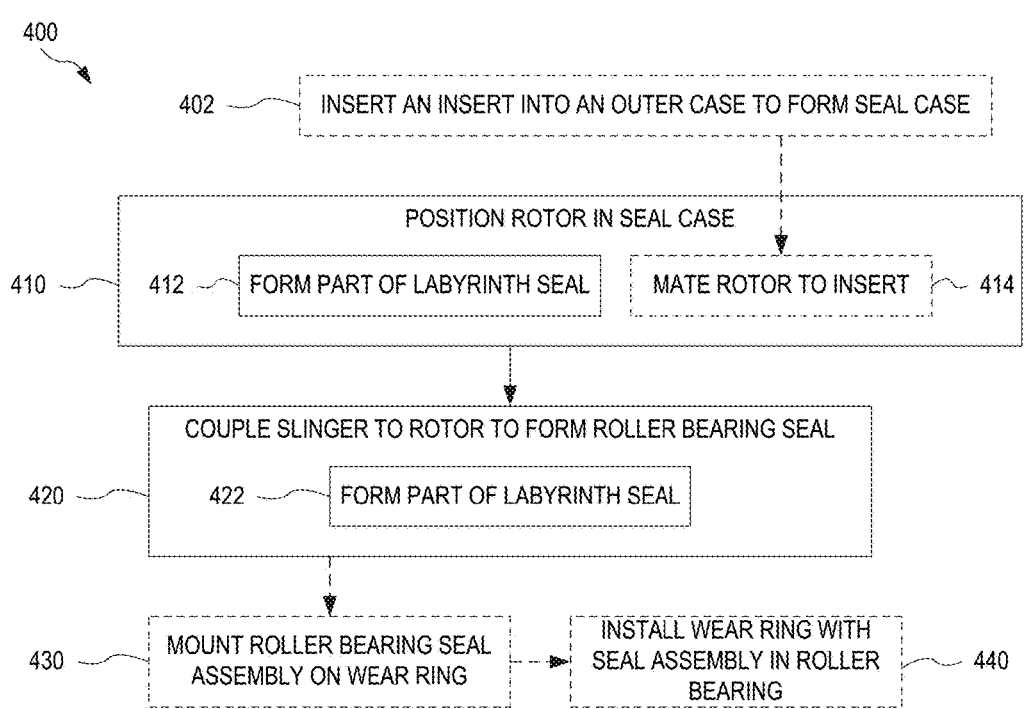
FIG. 4

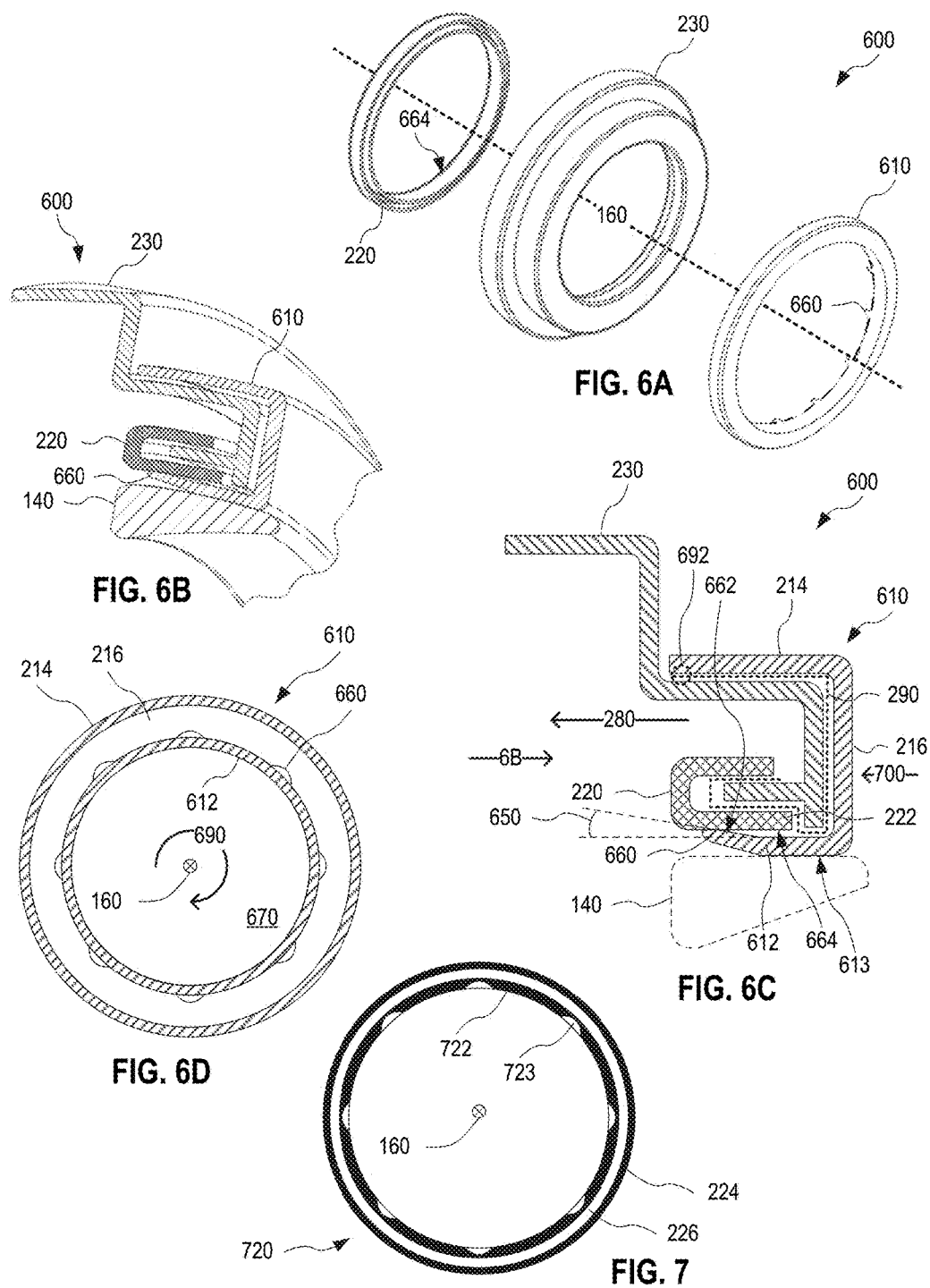

SLINGER FOR ROLLER BEARING SEAL, AND ASSOCIATED ASSEMBLIES AND METHODS

BACKGROUND

Demand for lower freight transportation cost is driving up the average freight car weight around the world. To carry heavier weight, the freight cars must be equipped with strong bearings capable of carrying both axial and radial loads. At the same time, the freight industry is pushed to carry heavier weights at higher speeds and with improved fuel efficiency.

Tapered roller bearings efficiently carry both axial and radial loads. A tapered roller bearing includes one or more rows of tapered rollers. Each row encircles the rotation axis of the bearing. Each tapered roller has the shape of a truncated cone. This geometry allows the tapered roller bearing to support axial loads (loads parallel to the rotation axis of the bearing). A popular choice for freight cars is the double-row tapered roller bearing which has two rows of tapered rollers. The two rows are tapered in opposite directions to locate the shaft, or journal, in both directions along the rotation axis.

Tapered roller bearings, as well as other types of roller bearings, operate with a lubricant within the bearing to reduce friction between the rollers and the raceways on which the rollers roll. To contain the lubricant within the bearing and to prevent water, dirt, and other contaminants from entering the bearing, the bearing is equipped with a seal. The seal may be a contact seal that forms a physical barrier between the inside of the bearing and the external environment. This physical barrier, however, requires direct contact between parts moving relative to each other, such as direct contact between one part that does not rotate and another part that rotates because it is affixed to a rotating journal. Thus, a contact seal is associated with friction which causes wear and tear of the components. Not only does the wear and tear result in damage and present a maintenance problem, but the friction also reduces fuel efficiency and may generate excessive heat at high speeds. In contrast, a noncontact seal has no direct physical contact between non-rotating and rotating parts (or between parts rotating at different speeds). One type of noncontact seal is a labyrinth seal, which forms a labyrinth between stationary and rotating parts (or between parts rotating at different speeds). The labyrinth seal limits transport of material between the interior of the bearing and the external environment to a tortuous path that reduces or prevents both loss of lubricant from the bearing and entry of contaminants into the bearing. Some labyrinth seals include a slinger that rotates with the journal. The slinger's rotation, especially when operating at high rotation speeds, further prevents both transport of lubricant out of the bearing and entry of contaminants into the bearing. Labyrinth seals are not restricted to noncontact seals but may also include a resilient gasket to form a contact seal with minimal friction.

SUMMARY

In an embodiment, a slinger for a roller bearing seal includes an inner section, an outer section, and a middle section defining respective portions of a single continuous part. The inner section extends at least in a first direction parallel to a rotation axis of the slinger, encircles the rotation axis, and forms a plurality of tabs configured to pressure fit the slinger onto a rotor of a roller bearing seal. The outer section extends at least in the first direction at a greater distance than the inner section from the rotation axis and encircling the rotation axis. The middle section encircles the rotation axis and spans between the inner section and the outer section.

In an embodiment, a roller bearing seal assembly, forming a labyrinth seal, includes a seal case and a rotor coupled to the seal case to form a first portion of the labyrinth seal between the rotor and the seal case. The roller bearing seal assembly further includes a slinger coupled to the rotor via a pressure fit between an inward facing surface of the rotor and a plurality of tabs of the slinger. The slinger and the rotor form a second portion of the labyrinth seal therebetween.

In an embodiment, a method for assembling at least a portion of a roller bearing includes positioning a rotor in a seal case to form a first portion of a labyrinth seal. The method further includes pressure fitting a slinger onto the rotor by pressure fitting a plurality of tabs of the slinger onto an inward facing surface of the rotor, to form a second portion of the labyrinth seal.

BRIEF DESCRIPTION OF THE DRAWINGS

FIG. 2 is a cross-sectional view of a roller bearing seal assembly of the roller bearing of FIGS. 1A and 1B, according to an embodiment.

FIG. 3 illustrates a roller bearing seal assembly having a two-component seal case, according to an embodiment.

FIG. 4 illustrates a method for assembling a rotor bearing seal, according to an embodiment.

FIGS. 6A-D illustrate a roller bearing seal assembly that includes a slinger having a plurality of tabs for pressure fitting the slinger onto a rotor, according to an embodiment.

FIG. 7 illustrates an end view of one rotor configured for pressure fitting of the slinger of FIGS. 6A-D thereon, according to an embodiment.

DETAILED DESCRIPTION OF THE
EMBODIMENTS

Figure 1A:
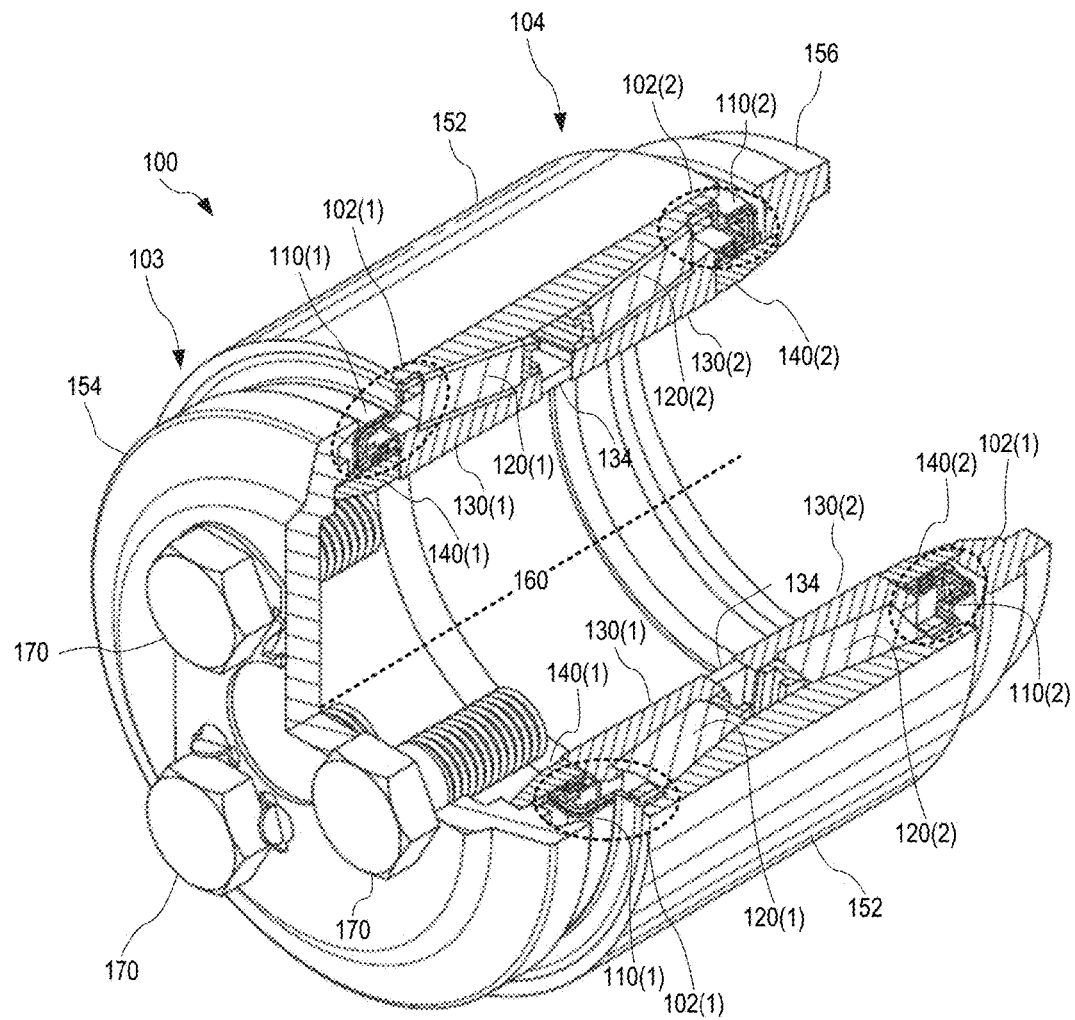
FIGS. 1A and 1B illustrate a slinger implemented in a roller bearing, according to an embodiment.
Figure 1B:
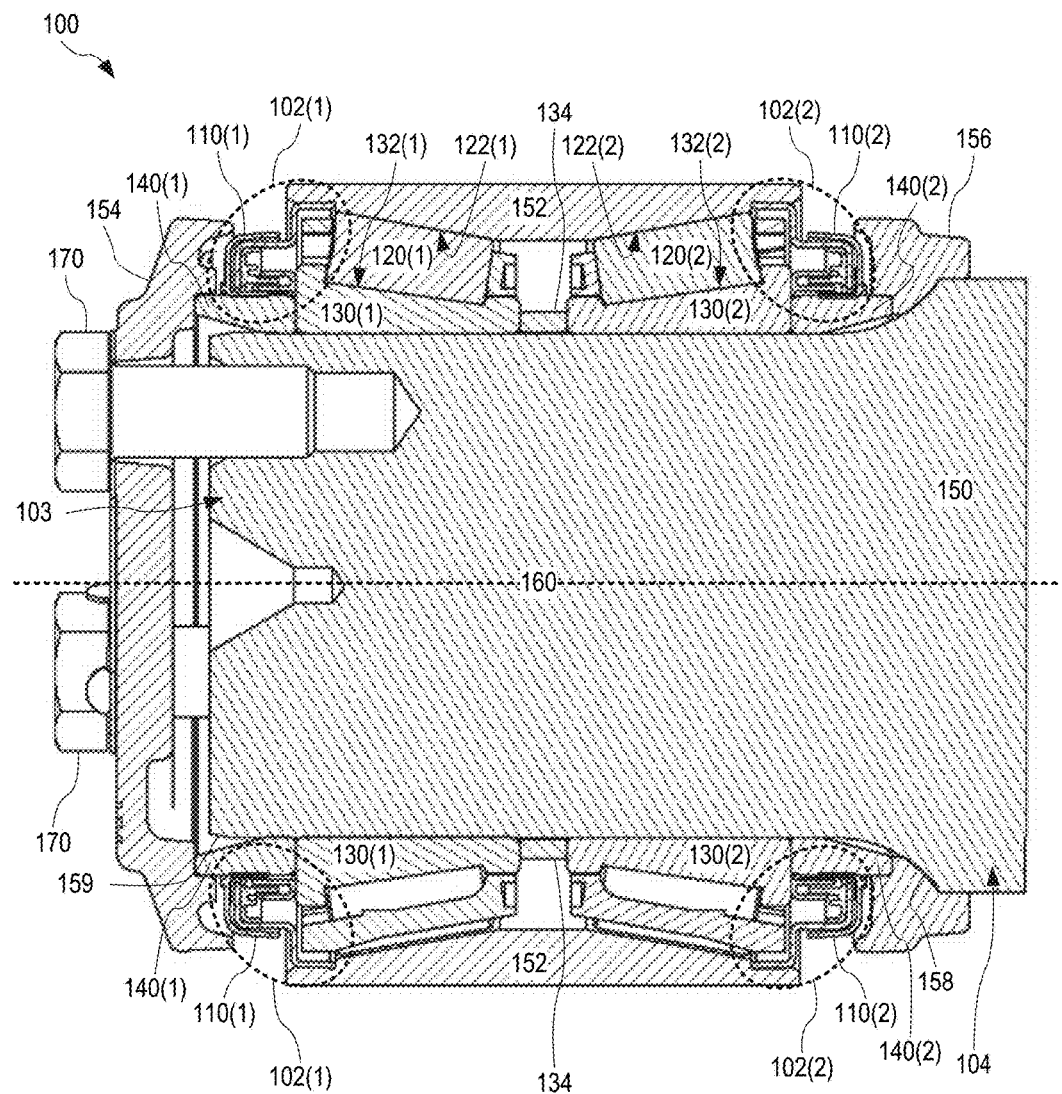

FIGS. 1A and 1B illustrate one slinger 110 implemented in a roller bearing 100. FIG. 1A shows roller bearing 100 in perspective view with a section cut out to reveal inner parts. FIG. 1B shows a sectional view of roller bearing 100 mounted on a journal 150. FIGS. 1A and 1B are best viewed together in the following description. Roller bearing 100 is for example suitable for use in a freight car. Slinger 110 forms part of a roller bearing seal assembly 102. Roller bearing 100 is a double-row tapered roller bearing and includes two instances 102(1) and 102(2) of roller bearing seal assembly 102. Roller bearing seal assemblies 102(1) and 102(2) include two respective instances 110(1) and 110(2) of slinger 110. Each instance of both roller bearing seal assembly 102 and slinger 110 encircles a rotation axis 160 of roller bearing 100.

As implemented in roller bearing 100, slinger 110 cooperates with parts of roller bearing seal assembly 102 to form part of a labyrinth seal, thus extending a tortuous path for fluids and solids to leave or enter roller bearing 100. By virtue of its rotation relative to other parts of roller bearing seal assembly 102, slinger 110 may also prevent transport of fluids and solids into and out of roller bearing 100. In one embodiment, roller bearing seal assemblies 102 are noncontact seals. In another embodiment, roller bearing seal assemblies 102 are contact seals closed by a resilient member (not shown in FIGS. 1A and 1B). Roller bearing seal assemblies 102(1) and 102(2) are identical.

In the embodiment of FIGS. 1A and 1B, roller bearing 100 is configured for mounting on journal 150 of an axle, such as a rail car axle or a truck axle. Roller bearing 100 includes two rows of tapered rollers 120: an outboard row of tapered rollers 120(1) near outboard end 103 of journal 150, and an inboard row of tapered rollers 120(2) near inboard end 104 of journal 150. Each tapered roller 120 has the shape of a truncated cone. Tapered rollers 120(1) are tapered in the opposite direction of tapered rollers 120(2). Tapered rollers 120(1) and 120(2) are positioned between a bearing cup 152 and respective bearing cones 130(1) and 130(2). Bearings cones 130 are mounted on journal 150. In the embodiment depicted in FIGS. 1A and 1B, roller bearing 100 includes a spacer ring 134 between bearing cones 130(1) and 130(2) to ensure accurate positioning of bearing cones 130(1) and 130(2). Without departing from the scope hereof, bearing cones 130(1) and 130(2) may instead be sized so as to be in direct contact with each other with no need for spacer ring 134; or bearing cones 130(1) and 130(2) may be implemented in a single, integrally formed two-sided bearing cone.

In one embodiment, tapered rollers 120 are seated in seats of bearing cones 130, and bearing cup 152 has raceways 122(1) and 122(2). The seats of bearing cones 130 serve to maintain a desired spacing between tapered rollers 120 of each row. In this embodiment, as journal 150 rotates relative to bearing cup 152, tapered rollers 120(1) and 120(2) roll on respective raceways 122(1) and 122(2) of bearing cup 152 while also rotating in the seats of respective bearing cones 130(1) and 130(2). In another embodiment, tapered rollers 120 are seated in seats of bearing cup 152, and bearing cones 130(1) and 130(2) has raceways 132(1) and 132(2), respectively. The seats of bearing cup 152 serve to maintain a desired spacing between tapered rollers 120 of each row. In this embodiment, as journal 150 rotates relative to bearing cup 152, tapered rollers 120(1) and 120(2) roll on respective raceways 132(1) and 132(2) of bearing cones 130(1) and 130(2), respectively, while also rotating in the seats of bearing cup 152.

Roller bearing seal assemblies 102(1) and 102(2) seal the outboard and inboard sides, respectively, of roller bearing 100. Roller bearing seal assemblies are mounted on respective wear rings 140(1) and 140(2) affixed to and encircling journal 150. Wear rings 140 encircle rotation axis 160.

In the embodiment depicted in FIGS. 1A and 1B, journal 150 has a fillet 158 at its inboard end 104 and terminates a tapered guide portion 159 at its outboard end 103. Tapered portion 159 eases installation of roller bearing 100 onto journal 150. Roller bearing 100 is axially clamped between (a) a backing ring 156 backed up against fillet 158 and (b) a retaining cap 154 affixed to outboard end 103 of journal 150 via bolts (or screws) 170. More specifically, bearing cones 130 are sandwiched between wear rings 140, which in turn are clamped between backing ring 156 and retaining cap 154.

Without departing from the scope hereof, roller bearing 100 may be a different type of roller bearing than shown in FIGS. 1A and 1B, such as a single-row tapered roller bearing, a quadruple-row tapered roller bearing, a cylindrical roller bearing, a spherical roller bearing, or a ball bearing. In such alternative embodiments, bearing cup 152, tapered rollers 120, and bearing cones 130 are replaced by suitable components to form the corresponding type of roller bearing; yet these embodiments of roller bearing 100 still include roller bearing seal assemblies 102. Likewise, the tapering directions of inboard roller bearing assemblies 102(2) and outboard roller bearing assemblies 102(1) may be inverted as from what is depicted in FIGS. 1A and 1B. Furthermore, while operation of roller bearing 100 typically involves rotation of journal 150 relative to a non-rotating bearing cup 152, the roles may be reversed such that bearing cup 152 rotates about a stationary journal 150, or bearing cup 152 and journal 150 rotate at different speeds.

FIG. 2 provides a more detailed view of roller bearing seal assembly 102 in cross section. The cross section depicted in FIG. 2 is equivalent to the upper portion of the sectional view of roller bearing seal assembly 102(2) shown in FIGS. 1A and 1B, but applies to roller bearing seal assembly 102(1) as well. Roller bearing seal assembly 102 includes slinger 110, a rotor 220, and a seal case 230. Slinger 110 is coupled to rotor 220. The coupling geometry between slinger 110 and rotor 220 may be different from that depicted in FIG. 2 without departing from the scope hereof, such as the coupling geometries shown and described in connection with FIGS. 5 and 6A below. Without departing from the scope hereof, slinger 110 may be provided as a standalone item, for example configured to be assembled with third-party components to form roller bearing seal assembly 102 or another roller bearing seal assembly.

When implemented in roller bearing 100, slinger 110 is mounted on a wear ring 140, wear ring 140 and rotor 220 are pressed against bearing cones 130, and seal case 230 is coupled to bearing cup 152. More generally, when roller bearing seal assembly 102 is implemented in roller bearing 100 or another type of roller bearing, slinger 110 and rotor 220 are fixed directly or indirectly to journal 150 (or another type of journal or axle), whereas seal case 230 is fixed to another component that is free to rotate relative to journal 150 (or another type of journal or axle). Thus, in operation, the rotation of slinger 110 and rotor 220 is locked to that of the journal or axle, while slinger 110 and rotor 220 together rotate relative to seal case 230.

Slinger 110 includes an inner section 212, an outer section 214, and a middle section 216 that spans between inner section 212 and outer section 214. Each of inner section 212, outer section 214, and middle section 216 encircles the rotation axis of roller bearing seal assembly 102, e.g., rotation axis 160. Slinger 110 is one continuous part, with inner section 212, outer section 214, and middle section 216 defining respective portions of the one continuous part. In an embodiment, inner section 212, outer section 214, and middle section 216 are integrally formed from the same material, for example via injection molding or machining. Inner section 212 and outer section 214 both extend at least in a direction 280 that is parallel to rotation axis 160. Inner section 212 is closer to rotation axis 160 and outer section 214 is further from rotation axis 160, such that the diameter of outer section 214 is greater than that of inner section 212. In other words, outer section 214 is at a greater radial distance than inner section 212 from rotation axis 160. Inner section 212 wraps around at least a portion of rotor 220, and outer section 214 wraps around at least a portion of seal case 230. In an embodiment, inner section 212 has an inward facing surface 213 that is substantially parallel to direction 280 ("inward facing" here means facing toward the associated rotation axis, e.g., rotation axis 160, and "outward facing" here means facing away from the associated rotation axis, e.g., rotation axis 160.) This embodiment is suitable for mounting of slinger 110 on wear ring 140 (as indicated in FIG. 2). In one implementation, inner section 212 and outer section 214 are substantially parallel to direction 280, wherein outer section 214 may be at an angle of up to, for example, ten degrees to direction 280. Middle section 216 may be substantially perpendicular to direction 280.

Rotor 220 includes an inner section 222, an outer section 224, and a middle section 226 that spans between inner section 222 and outer section 224. Each of inner section 222, outer section 224, and middle section 226 encircles the rotation axis of roller bearing seal assembly 102, e.g., rotation axis 160. Outer section 224 is at a greater radial distance than inner section 222 from rotation axis 160. Inner section 222 and outer section 224 both extend at least in a direction opposite direction 280. In an embodiment, inner section 222 and outer section 224 are substantially anti-parallel to direction 280, for example to within five degrees. Middle section 226 may be substantially perpendicular to direction 280.

As shown in FIG. 2, the diameter of inner section 212 of slinger 110 is less than the diameter of inner section 222 of rotor 220, and inner section 212 of slinger 110 is in contact with inner section 222 of rotor 220.

Seal case 230 includes a ring 238 that protrudes into the space between inner section 222 and outer section 224 of rotor 220. Slinger 110, rotor 220, and seal case 230 cooperate to form a labyrinth seal 290. One portion of labyrinth seal 290 is formed between slinger 110 and seal case 230, and another portion of labyrinth seal 290 is formed between rotor 220 and seal case 230. Labyrinth seal 290 provides a tortuous path for transport of (a) lubricant from a roller bearing sealed by roller bearing seal assembly 102 to outside roller bearing seal assembly 102 and (b) water, dirt, or other contaminants from outside roller bearing seal assembly 102 into a roller bearing sealed by roller bearing seal assembly 102. In addition, slinger 110 may further prevent such transport by virtue of its rotation relative to seal case 230.

In one embodiment, roller bearing seal assembly 102 is a noncontact seal (as shown in FIG. 2). However, without departing from the scope hereof, roller bearing seal assembly 102 may be a contact seal and include a resilient member, for example placed between outer section 214 of slinger 110 and seal case 230, such as at location 292.

In one embodiment, slinger 110 and rotor 220 are composed of a polymer, such as an engineering thermoplastic (such as polyester or a composite material), an ultraviolet-resistant polymer, or an ultraviolet-resistant engineering thermoplastic. In this embodiment, slinger 110 and/or rotor 220 may be produced by molding, for example injection-molding. In one example of this embodiment, slinger 110, and optionally also rotor 220, is composed of polymer. In another embodiment, one or both of slinger 110 and rotor 220 is composed of a suitable steel. In yet another embodiment, seal case 230 is composed of a suitable steel. Alternatively, seal case 230 or at least a portion thereof is composed of a polymer, such as one or more of the polymers listed above for slinger 110 and rotor 220.

FIG. 3 illustrates one roller bearing seal assembly 300 having a two-component seal case 330. Roller bearing seal assembly 300 is an embodiment of roller bearing seal assembly 102, FIGS. 1A and 1B. FIG. 3 shows roller bearing seal assembly 300 in the same view as roller bearing seal assembly 102, FIG. 2. Roller bearing seal assembly 300 includes slinger 110, rotor 220, and seal case 330. Slinger 110 and rotor 220 are configured as previously described for roller bearing seal assembly 102. Seal case 330 is an embodiment of seal case 230, and includes an outer case 332 and an insert 334. Insert 334 includes a ring 338 that protrudes into the space between inner section 222 and outer section 224 of rotor 220. Ring 338 is an embodiment of ring 238, FIG. 2.

In one embodiment, insert 334 is pressure fit inside outer case 332. In another embodiment, insert 334 is bonded to, screwed to, bolted to, or otherwise affixed to outer case 332.

Insert 334 may include one or more additional features protruding in the same direction as ring 338, to increase the length of labyrinth seal 290. One such exemplary, optional feature 336 is indicated in FIG. 3. Such additional protruding feature(s) may be included without departing from the scope hereof to further extend the length of labyrinth seal 290.

In one embodiment, outer case 332 is composed of a suitable steel, and insert 334 is composed of a polymer, such as an engineering thermoplastic (e.g., polyester or a composite material), an ultraviolet-resistant polymer, or an ultraviolet-resistant engineering thermoplastic. In this embodiment, insert 334 may be produced by molding, for example injection-molding. In one example of this embodiment, insert 334 is composed of a polymer. Alternatively, seal case 330 or at least a portion thereof is composed of a polymer.

FIG. 4 illustrates one method 400 for assembling a rotor bearing seal. Method 400 is for example used to make roller bearing seal assembly 102. A step 410 positions a rotor in a seal case. In one example of step 410, rotor 220 is positioned in seal case 230. Step 410 includes a step 412 of forming part of a labyrinth seal, such as the part of labyrinth seal 290 between rotor 220 and seal case 230.

In one embodiment, step 410 is preceded by a step 402, inserting an insert into an outer case to form the seal case, and step 410 implements a step 414, mating the rotor to the insert. In one example of this embodiment, insert 334 is inserted (step 402) into outer case 332 to form seal case 330, and rotor 220 is mated (step 414) to insert 334 with ring 338 protruding into the space between inner section 222 and outer section 224 of rotor 220.

A step 420 couples a slinger to the rotor to form the roller bearing seal. In one example of step 420, slinger 110 is coupled to rotor 220 as discussed above in reference to FIG. 2 to form roller bearing seal assembly 102. Step 420 includes a step 422 of forming part of a labyrinth seal, such as the part of labyrinth seal 290 between slinger 110 and rotor 220.

In an embodiment, method 400 is extended to include a step 430 of mounting the roller bearing seal assembly on a wear ring. In one example of step 430, roller bearing seal assembly 102 is mounted on wear ring 140, for example by pressing wear ring 140 into the central aperture of slinger 110 formed by inner section 212 such that inward facing surface 213 of slinger 110 is pressure fit onto wear ring 140.

Method 400 may further include a step 440 of installing the wear ring with the roller bearing seal assembly between a journal and a bearing cup to at least partly assemble a roller bearing. In one example of step 440, wear ring 140, with roller bearing seal assembly 102 mounted thereon, is installed between journal 150 and bearing cup 152 to at least partly assemble roller bearing 100.

Figure 5:
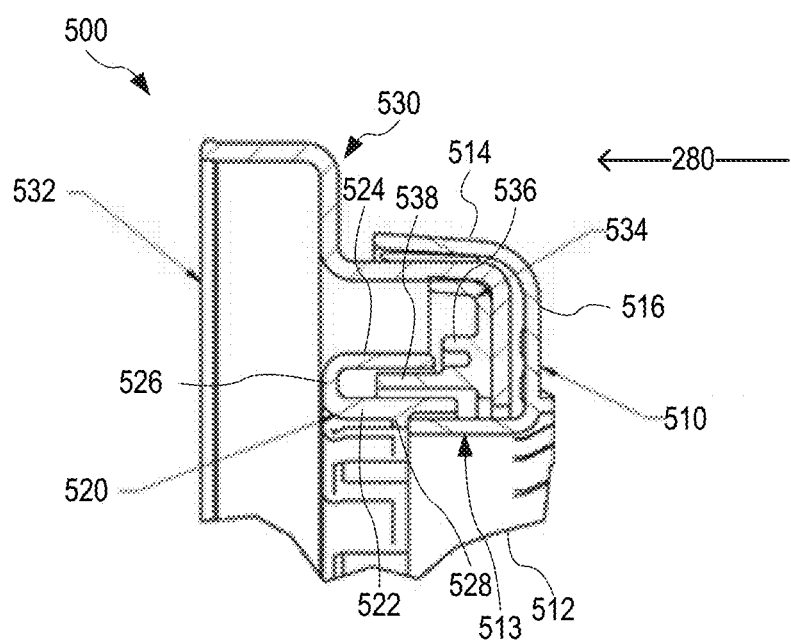
FIG. 5 illustrates another roller bearing seal assembly, according to an embodiment.

FIG. 5 illustrates one roller bearing seal assembly 500 in sectional view. The sectional view used in FIG. 5 is similar to the view of the upper portion of roller bearing seal assembly 102, FIGS. 1A and 1B. Roller bearing seal assembly 500 is an embodiment of roller bearing seal assembly 300 and may be assembled according to an embodiment of method 400. Roller bearing seal assembly 500 includes a slinger 510, a rotor 520, and a two-component seal case 530, which are embodiments of slinger 110, rotor 220, and seal case 330, respectively.

Seal case 530 includes an outer case 532 and an insert 534 pressure fit into outer case 532. Insert 534 includes a ring 538 that protrudes in direction 280, and an additional feature 536 also protruding in direction 280.

Rotor 520 includes an inner section 522, an outer section 524, and a middle section 526. Rotor 520 is mated to insert 534, with ring 538 protruding into the space between inner section 522 and outer section 524 of rotor 520.

Slinger 510 includes an inner section 512, an outer section 514, and a middle section 516. While FIG. 5 shows outer section 514 as being at an angle to direction 280, outer section 514 may be substantially parallel to direction 280 without departing from the scope hereof. Inner section 512 includes a surface 513 that is substantially parallel to direction 280.

Inner section 512 of slinger 510 is supported by a shelf 528 of inner section 522 of rotor 520. When coupling slinger 510 to rotor 520, slinger 510 is moved toward rotor 520 along direction 280 to seat inner section 512 on shelf 528. Shelf 528 may be a continuous shelf that encircles the rotation axis of roller bearing seal assembly 500, or shelf 528 may have gaps in places; for example shelf 538 may be a series of shorter shelves equally spaced about the rotation axis (parallel direction 280). In an embodiment of step 430 of method 400, when pressing a wear ring (e.g., wear ring 140) into the central aperture of slinger 510 along direction 280 there is a risk that inner section 512 of slinger 510 slips off shelf 528. In a scenario of this situation, slinger 510 is repositioned on rotor 520 before a second attempt is made to press the wear ring into the central aperture of slinger 510 (the central aperture of slinger 510 is the space enclosed by inner surface 513 as inner surface 513 encircles the rotation axis of roller bearing seal assembly 500). In another scenario, one or more components break, for example due to slinger 510 getting jammed between shelf 528 and the wear ring.

FIGS. 6A-D illustrate one roller bearing seal assembly 600 that includes a slinger 610 having a plurality of tabs 660 for pressure fitting slinger 610 onto rotor 220. Tabs 660 serve to better secure slinger 610 on rotor 220 so as to decrease the risk of slinger 610 slipping off the rotor, or getting misaligned relative to it, while pressing the wear ring into the central aperture of the slinger (for example during step 430 of method 400). Slinger 610 is different from slinger 510, FIG. 5, but it too may be provided as a standalone item, for example configured and assembled with third-party components to form roller bearing seal assembly 102 or another roller bearing seal assembly. Roller bearing seal assembly 600 is an embodiment of roller bearing seal assembly 102, FIGS. 1A and 1B, and may be assembled according to an embodiment of method 400. FIG. 6A is an exploded view of roller bearing seal assembly 600. FIG. 6B is a perspective view of a portion of the revolution of roller bearing assembly 600 about rotation axis 160, with roller bearing seal assembly 600 mounted on wear ring 140. FIG. 6C shows roller bearing seal assembly 600 in cross section, using the same view as used for roller bearing seal assembly 102, FIG. 2. FIG. 6D shows an end view of slinger 610, as viewed along direction 6B indicated in FIG. 6C. FIGS. 6A-D are best viewed together in the following description.

Roller bearing seal assembly 600 includes slinger 610, rotor 220, and seal case 230 (for example implemented as seal case 330, FIG. 3). Slinger 610 is an embodiment of slinger 110, FIG. 2, wherein inner section 212 is implemented as an inner section 612 that forms tabs 660. Tabs 660 angle outwardly, away from rotation axis 160, by an angle 650. Tabs 660 are sufficiently flexible to allow pressure fitting tabs 660 onto rotor 220. In an embodiment of step 420, FIG. 4, when coupling slinger 610 onto rotor 220, tabs 660 deform and outward facing surfaces 662 of tabs 660 press on inward facing surface 664 of rotor 220. This deformation may involve a reduction of angle 650. The pressure fit between slinger 610 and rotor 220 significantly reduces and possibly eliminates the risk of slinger 610 slipping off rotor 220 when inserting wear ring 140 (or another wear ring) into the central aperture 670 of slinger 610 (e.g., during a step 430, FIG. 4).

When sliding the wear ring (e.g., wear ring 140) into central aperture 670, the pressure between the wear ring and an inward facing surface 613 of inner section 612 may further deform tabs 660. This further deformation may reduce angle 650, as compared to angle 650 prior to inserting the wear ring into central aperture 670. In some embodiments, insertion of the wear ring into central aperture 670 may partly or fully flatten tabs 660, and optionally other portions of inner section 612 between tabs 660 and middle section 216, against inward facing surface 664.

In an embodiment, the magnitude of angle 650, prior to pressure fitting slinger 610 onto rotor 220, is in the range between 0.1 and ten degrees, for example in the range between 0.5 and 1.5 degrees. Tabs 660 may be equally spaced about rotation axis 160. In one embodiment, slinger 610 forms three or more tabs 660, for example between three and one hundred tabs 660, or between eight and twenty tabs 660.

In another embodiment, roller bearing seal assembly 600 is a noncontact seal (as shown in FIG. 6C). However, without departing from the scope hereof, roller bearing seal assembly 600 may instead be a contact seal and include a resilient member, for example placed between outer section 214 of slinger 610 and seal case 230 (such as at location 692 indicated in FIG. 6C).

FIG. 7 illustrates one rotor 720 configured for pressure fitting of slinger 610 thereon. FIG. 7 shows an end view of rotor 720, as viewed along direction 700 indicated in FIG. 6C. Rotor 720 is an embodiment of rotor 220, FIG. 2, and is suitable for implementation in roller bearing seal assembly 600. Rotor 720 includes an inner section 722, outer section 224, and middle section 226. In rotor 720, middle section 226 spans between inner section 722 and outer section 224. Inner section 722 is an embodiment of inner section 222 and includes a plurality of notches 723 configured to accommodate tabs 660 therein. When pressure fitting slinger 610 onto rotor 720 (e.g., step 420 of method 400), each tab 660 is registered to a corresponding notch 723. In one embodiment, the number of notches 723 in rotor 720 equals the number of tabs 660 in slinger 610. In another embodiment, the number of notches 723 in rotor 720 exceeds the number of tabs 660 in slinger 610. For example, if tabs 660 are far apart, registration of tabs into notches 723 may be easier if the number of notches 723 exceeds the number of tabs 660, so as to reduce the amount of rotation required about rotation axis 160 and to properly register tabs 660 in notches 723.

The shape of notches 723 may be complementary to that of tabs 660 to provide a relatively tight fit in the angular dimension 690 (azimuth angle) about rotation axis 160. Alternatively, notches 723 may be wider than tabs 660 in angular dimension 690.

Figure 8:
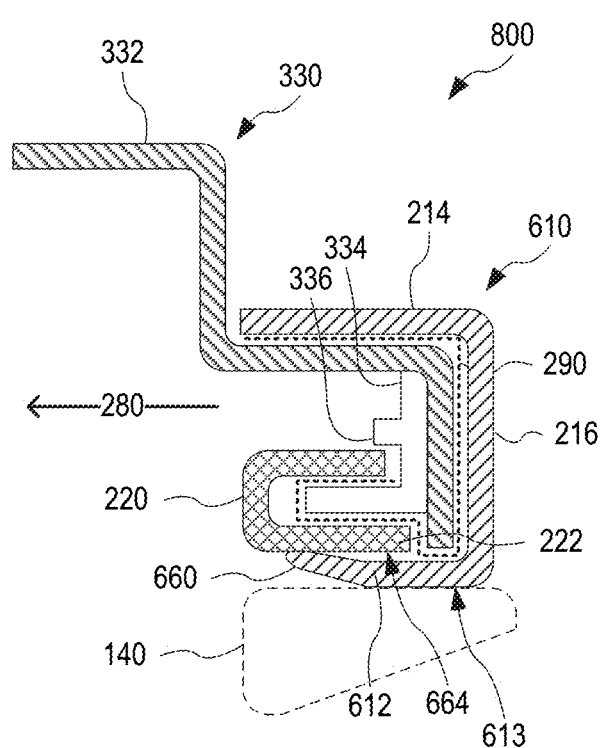
FIG. 8 illustrates another exemplary roller bearing seal assembly that includes a slinger with tabs for pressure fitting the slinger onto a rotor, according to an embodiment.

FIG. 8 illustrates another roller bearing seal assembly 800 that includes slinger 610 with tabs 660 for pressure fitting slinger 610 onto the rotor. Roller bearing seal assembly 800 is an embodiment of roller bearing seal assembly 102, and may be assembled according to an embodiment of method 400, FIG. 4. Roller bearing seal assembly 800 is similar to roller bearing seal assembly 600, except for requiring two-component seal case 330.

Figure 9:
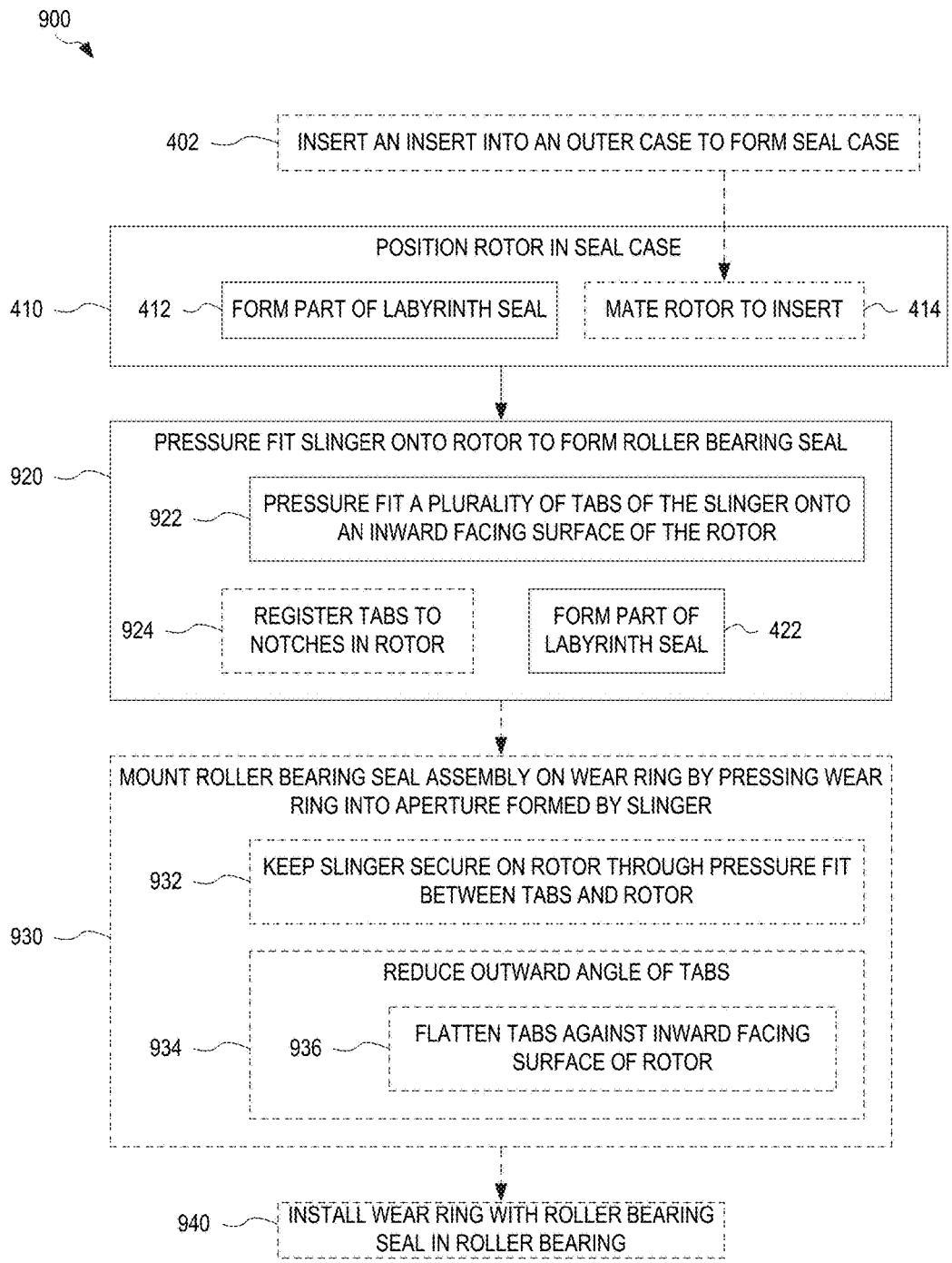
FIG. 9 illustrates a method for assembling a rotor bearing seal in part by pressure fitting a slinger onto a rotor, according to an embodiment.

FIG. 9 illustrates one method 900 for assembling a rotor bearing seal in part by pressure fitting a slinger onto a rotor. Method 900 is an embodiment of method 400, FIG. 4, and is for example used to assemble roller bearing seal assembly 600.

Method 900 includes step 410 and, optionally, step 402, performed as discussed above in reference to FIG. 4. After completion of step 410 to position a rotor in a seal case, a step 920 pressure fits a slinger onto the rotor to form a roller bearing seal assembly (e.g., assembly 800, FIG. 8). Step 920 is an embodiment of step 420. In one example of step 920, slinger 610 is pressure fit onto rotor 220 or rotor 720, as discussed above in reference to FIGS. 6A-D and 7.

Step 920 includes a step 922 of pressure fitting a plurality of tabs of the slinger onto an inward facing surface of the rotor. In one example of step 922, tabs 660 of slinger 610 are pressure fit onto inward facing surface 664 of rotor 220, as discussed above in reference to FIGS. 6A-D. In an embodiment, step 920 further includes a step 924 of registering the tabs of the slinger to notches in the rotor. In one example of this embodiment, method 900 utilizes rotor 720, and step 924 registers tabs 660 to notches 722. Step 920 includes step 422, performed as discussed above in referenced to FIG. 4.

In an embodiment, method 900 is extended to include a step 930 of mounting the roller bearing seal assembly on a wear ring. Step 930 is for example an embodiment of step 430, FIG. 4. Step 930 includes a step 932 of keeping the slinger secure on the rotor through the pressure fit between the rotor and the tabs of the slinger. In one example of step 930, roller bearing seal assembly 600 is mounted on wear ring 140 by pressing wear ring 140 into central aperture 670 of slinger 610, whereinafter tabs 660 keep slinger 610 secure on rotor 220. Optionally, step 930 includes a step 934 of reducing the outward angle of the tabs. Step 934 may include a step 936 of partly or fully flattening the tabs against the inward facing surface of the rotor. In one example of step 934, wear ring 140 is inserted into central aperture 670, which reduces angle 650 (as discussed above in reference to FIGS. 6A-D). In one example of step 934 implementing step 936, wear ring 140 is inserted into central aperture 670, reducing angle 650 and partly or fully flattening tabs 660 (and, optionally, other portions of inner section 612 of slinger 610 between tabs 660 and middle section 216) against inward facing surface 664.

Method 900 may further include step 940 of installing the wear ring with the roller bearing seal assembly between a journal and a bearing cup to at least partly assembly a roller bearing. In one example of step 940, wear ring 140, with roller bearing seal assembly 600 mounted thereon, is installed between journal 150 and bearing cup 152 to at least partly assemble an embodiment of roller bearing 100.

Figure 10A:
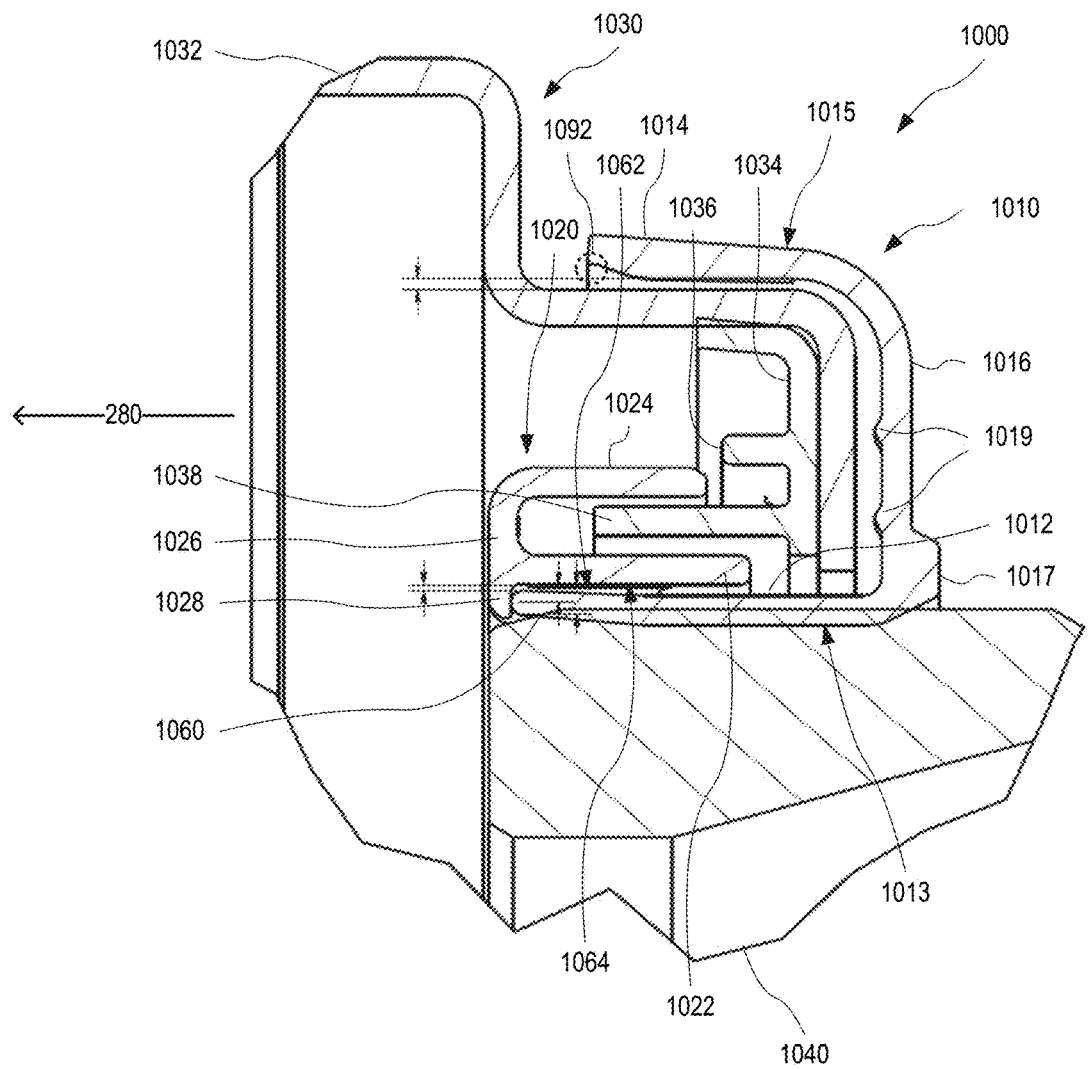
FIGS. 10A-C illustrate yet another roller bearing seal assembly that includes a slinger with a plurality of tabs for pressure fitting the slinger onto a rotor, according to an embodiment.
Figures 10B, 10C:
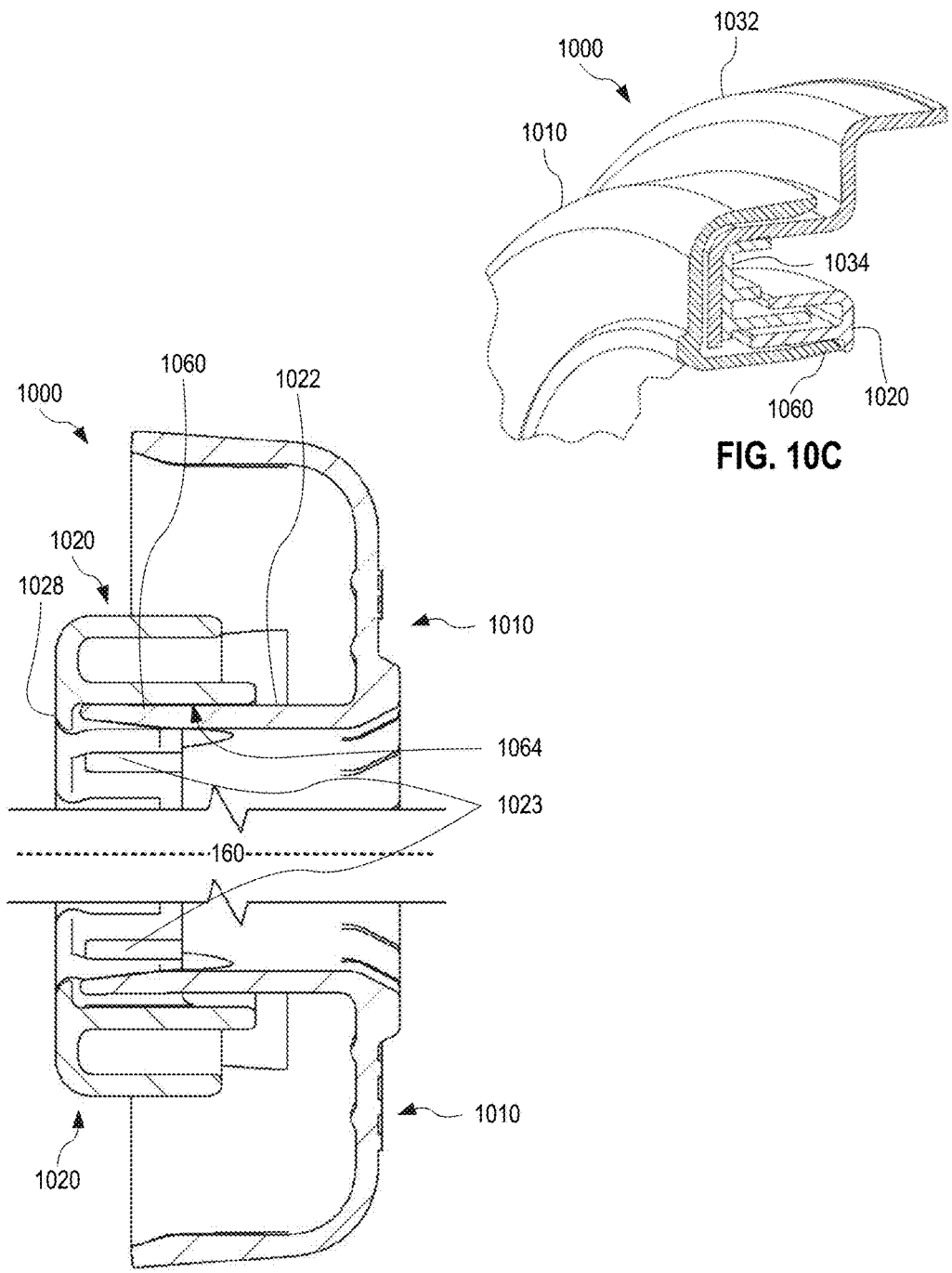

FIGS. 10A-C illustrate another roller bearing seal assembly 1000 that includes a slinger 1010 with a plurality of tabs 1060 that pressure fit slinger 1010 onto a rotor 1020. FIG. 10A shows a cross sectional view of a portion of roller bearing seal assembly 1000, similar to the view used for roller bearing seal assembly 102 in FIG. 2, as mounted on a wear ring 1040 (an embodiment of wear ring 140). FIG. 10B shows a truncated cross-sectional view of slinger 1010 and rotor 1020 of roller bearing seal assembly 1000. FIG. 10C is a perspective view of a portion of the revolution of roller bearing seal assembly 1000 about rotation axis 160. FIGS. 10A-C are best viewed together in the following description. Roller bearing seal assembly 1000 may for example be assembled according to method 900, FIG. 9. Roller bearing seal assembly 1000 includes slinger 1010, rotor 1020, and a two-component seal case 1030. Slinger 1010, rotor 1020, and seal case 1030 are embodiments of slinger 610, rotor 220, and seal case 330, respectively, of FIG. 8. Without departing from the scope hereof, slinger 110 may be provided as a standalone item; or it may be configured to be assembled with third-party components to form roller bearing seal assembly 102 or another roller bearing seal assembly.

Slinger 1010 includes an inner section 1012, an outer section 1014, and a middle section 1016. Inner section 1012 forms a plurality of tabs 1060. Tabs 1060 are for example embodiments of tabs 660. Inner section 1012 has an inward facing surface 1013 that is substantially parallel to rotation axis 160 of roller bearing seal assembly 1000. When roller bearing seal assembly 1000 is mounted on wear ring 1040, wear ring 1040 is pressure fit onto inward facing surface 1013 and possibly also onto an inward facing surface of tabs 660.

In the embodiment shown in FIGS. 10A-C, middle section 1016 forms features 1019 protruding into the labyrinth seal of roller bearing seal assembly 1000. As slinger 1010 rotates relative to outer case 1032, features 1019 serve to further prevent transport of (a) water, dirt, and other contaminants into a roller bearing sealed by roller bearing seal assembly 1000 and (b) lubricant out of a roller bearing sealed by roller bearing seal assembly 1000. In the embodiment shown in FIGS. 10A-C, slinger 1010 further includes a guide ring 1017 (labeled in FIG. 10A) that helps guide wear ring 1040 into the central aperture formed by slinger 1010. Guide ring 1017 may be a continuous ring encircling the rotation axis of roller bearing seal assembly 1000. Without departing from the scope hereof, slinger 1010 may be provided without features 1019 and/or without guide ring 1017. Although shown in FIGS. 10A-C as being angled outward and away from the rotation axis of roller bearing seal assembly 1000, the outward facing surface 1015 of outer section 1014 of slinger 1010 may be substantially parallel to the rotation axis of roller bearing seal assembly 1000 without departing from the scope hereof.

Rotor 1020 includes an inner section 1022, an outer section 1024, and a middle section 1026 (labeled in FIG. 10A). Rotor 1020 further includes a series of stops 1028, which serves as a stops for tabs 1060. Each step 1028 is located at the bottom of a corresponding notch 1023 of rotor 1020.

During assembly, an outward facing surface 1062 of tabs 1060 is pressed onto an inward facing surface 1064 of inner section 1022 of rotor 1020, in a manner similar to that of slinger 610 and rotor 220 discussed above in reference to FIGS. 6A-D.

Seal case 1030 includes an outer case 1032 and an insert 1034. Insert 1034 is pressure fit into outer case 1032. Insert 1034 includes a ring 1038 which protrudes into the space between inner section 1022 and outer section 1024 of rotor 1020. Insert 1034 also forms an additional feature 1036.

In one embodiment, roller bearing seal assembly 1000 is a noncontact seal (as shown in FIG. 10A). However, without departing from the scope hereof, roller bearing seal assembly 1000 may be a contact seal and include a resilient member placed for example between outer section 1024 of slinger 1010 and outer case 1032 of seal case 1030 (such as at location 1092 indicated in FIG. 10A).

Figure 11:
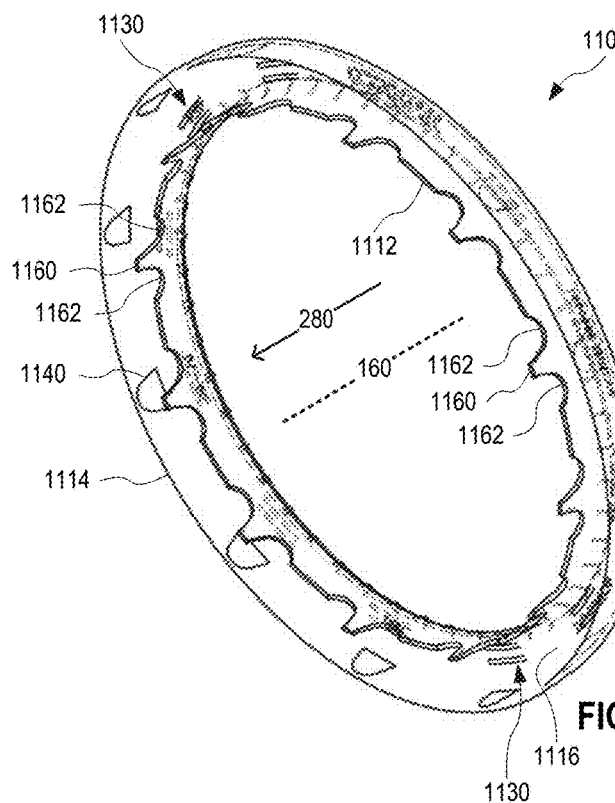
FIG. 11 illustrates a slinger with a plurality of tabs and stress-relieving recesses adjacent each tab, according to an embodiment.

FIG. 11 illustrates one slinger 1100 having a plurality of tabs 1160 and stress-relieving recesses 1162 adjacent each tab 1160. Tabs 1160 serve to pressure fit slinger 1100 onto an inward facing surface of a rotor, such as rotor 1020. Slinger 1100 is an embodiment of slinger 1010, and tabs 1160 are embodiments of tabs 1060, FIGS. 10A-C. Slinger 1100 includes an inner section 1112, an outer section 1114, and a middle section 1116.

In addition to forming tabs 1160, inner section 1112 also forms recesses 1162 adjacent each tab 1160. Recesses 1162 serve to relieve stress associated with the deformation of tabs 1160 when positioned between rotor 1020 and a wear ring such as wear ring 1040, FIG. 10A.

Figure 12:
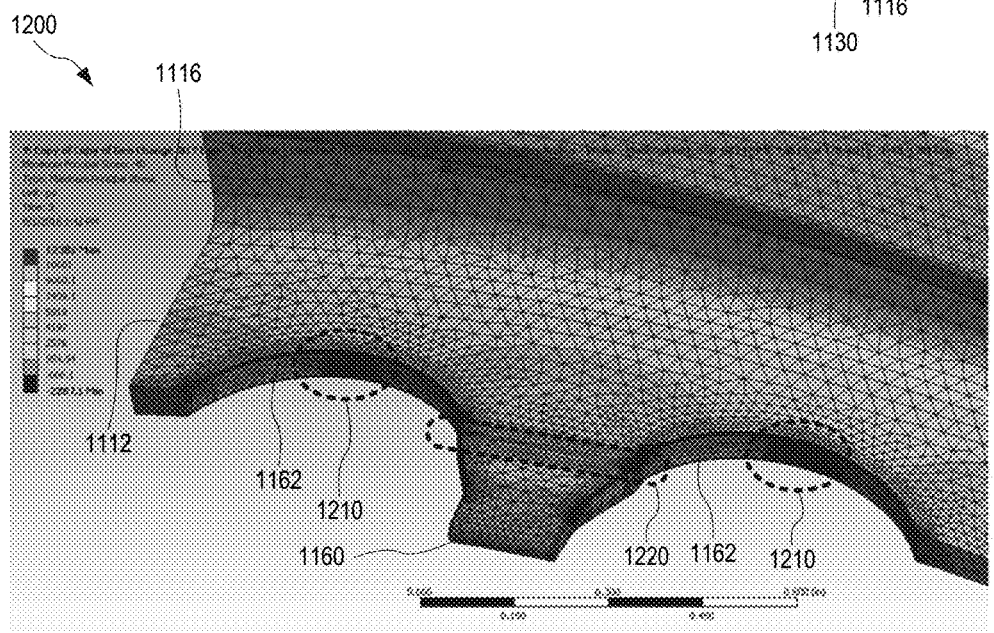
FIG. 12 is an exemplary stress model for the slinger of FIG. 11 when pressure fit between a rotor and a wear ring.

FIG. 12 is a stress model 1200 for slinger 1100 when pressure fit between rotor 1020 and wear ring 1040. Stress model 1200 is an example of the stress on slinger 1100 when implemented in roller bearing 100. Stress model 1200 assumes a temperature of −40° F. This temperature coincides with the typical lower end of a required operating range for a rail car. Since the magnitude of stress generally is greater at cold temperatures, stress model 1200 represents an exemplary worst case scenario for an exemplary application of slinger 1100. The principal stress in stress model 1200 has highest positive value in regions 1210 at the bottom of recesses 1162. High positive stress above a certain value is associated with breakage of the part. However, 13,000 pounds per square inch (psi) is deemed a safe threshold below which breakage will not occur. The principal stress in regions 1210 is 12,300 psi and below safe threshold. Thus, stress model 1200 demonstrates that, even under the most challenging environmental conditions, slinger 1100 remains intact.

Figure 13:
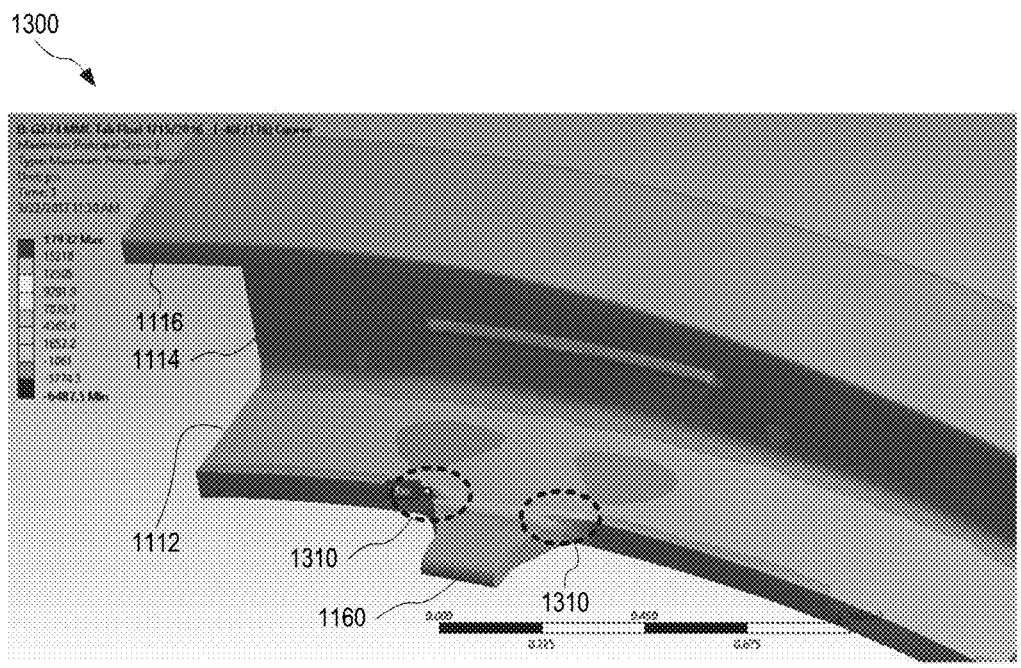
FIG. 13 is an exemplary stress model for a modified version of the slinger of FIG. 11, without stress-relieving recesses, when pressure fit between a rotor and a wear ring.

FIG. 13 is a stress model 1300 for a modified version of slinger 1100 which does not include stress-relieving recesses 1162. Apart from the absence of stress-relieving recesses 1162, stress model 1300 assumes the same configuration and environmental conditions as used to generate stress model 1200. Stress model 1300 attains highest positive principal stress in regions 1310 at the base of tabs 1160. The principal stress in regions 310 reaches a value of 17,900 psi, which is greater than the safe threshold discussed above in reference to FIG. 12. For comparison, due to the stress relieving effect of recesses 1162, the principal stress in regions 1220 of stress model 1200 does not exceed 8,000 psi.

Referring again to FIG. 11, middle section 1116 forms pairs of ribs 1130, and outer section 1114 has inward facing features 1140. Ribs 1130 and features 1140 protrude into the labyrinth seal formed when implementing slinger 1100 in roller bearing seal assembly 1000, to enhance the effectiveness of the labyrinth seal, as discussed above in reference to features 1019. However, without departing from the scope hereof, slinger 1100 may be provided without ribs 1130 and/or without features 1140.

Although FIG. 11 shows slinger 1100 as having twelve tabs 1160, slinger 1100 may be provided with a different number of tabs 1160 without departing from the scope hereof. For example, the number of tabs 1160 formed by inner section 1112 of slinger 1100 may be in the range between six and thirty. Furthermore, while FIG. 11 shows a unique pair of recesses 1162 associated with each tab 1160—such that there are two recesses 1162 between each pair of nearest-neighbor tabs 1160—slinger 1100 may instead include only one recess between each pair of nearest-neighbor tabs 1160. The shapes of tabs 1160 and/or recesses 1162 may also differ from those shown in FIG. 11.

Figure 14:
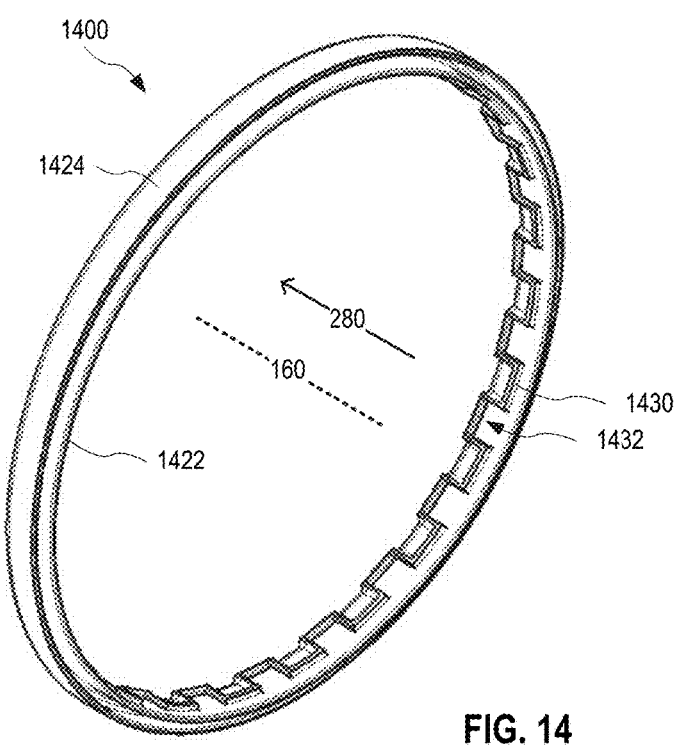
FIG. 14 illustrates a rotor having a crown with notches for accommodating tabs of the slinger of FIG. 11, according to an embodiment.

FIG. 14 illustrates one rotor 1400 having a crown 1430 with notches 1432 for accommodating tabs 1160 of slinger 1100. Rotor 1400 is an embodiment of rotor 1020. Rotor 1400 has an inner section 1422, an outer section 1424, and a middle section that spans between inner section 1422 and outer section 1424. The middle section is not visible in FIG. 14. The inward facing surface of inner section 1422 forms crown 1430 with notches 1432.

In the embodiments depicted in FIGS. 11 and 14, rotor 1400 has twice as twice as many notches 1432 as the number of tabs 1160 of slinger 1100, such that when slinger 1100 is pressure fit onto rotor 1400, only every other notch 1432 is occupied by a tab 1160. Without departing from the scope hereof, rotor 1400 may instead be configured with a number of notches 1432 that matches the number of tabs 1160 of slinger 1100. Also without departing from the scope hereof, slinger 1100 and rotor 1400 may be cooperatively configured such that only every Nth notch 1432 of rotor 1400 is occupied by a tab 1160 when slinger 1100 is pressure fit onto rotor 1400, wherein N is greater than two. Furthermore, the shape of notches 1432 may differ from those shown in FIG. 14 without departing from the scope hereof.

Figure 15:
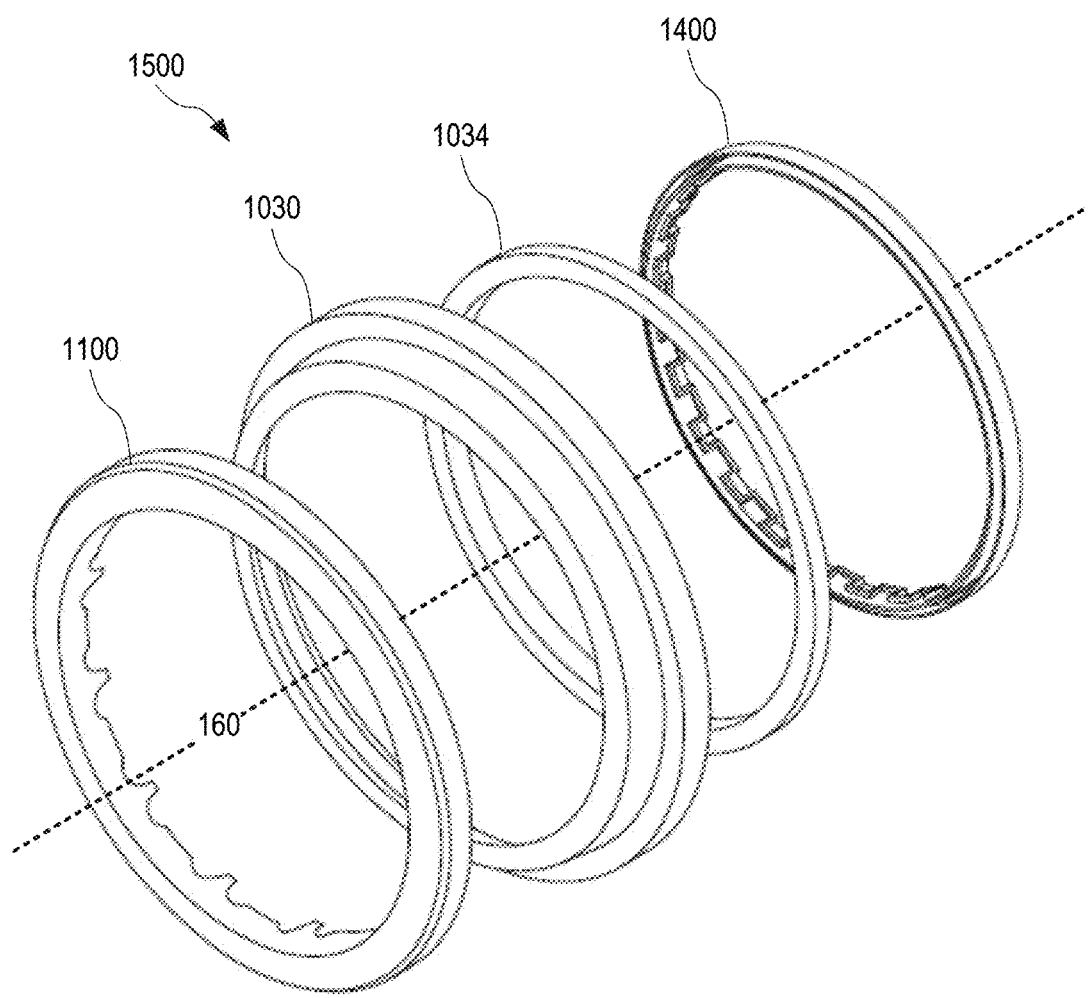
FIG. 15 illustrates a roller bearing assembly implementing the slinger of FIG. 11 and the rotor of FIG. 14, according to an embodiment.

FIG. 15 is an exploded view of one roller bearing seal assembly 1500 implementing slinger 1100 and rotor 1400. Roller bearing seal assembly 1500 is an embodiment of roller bearing seal assembly 1000. Roller bearing seal assembly 1500 includes slinger 1100, rotor 1400, seal case 1030, and insert 1034, assembled as shown for roller bearing seal assembly 1000 in FIGS. 10A-C.

Figure 16A:
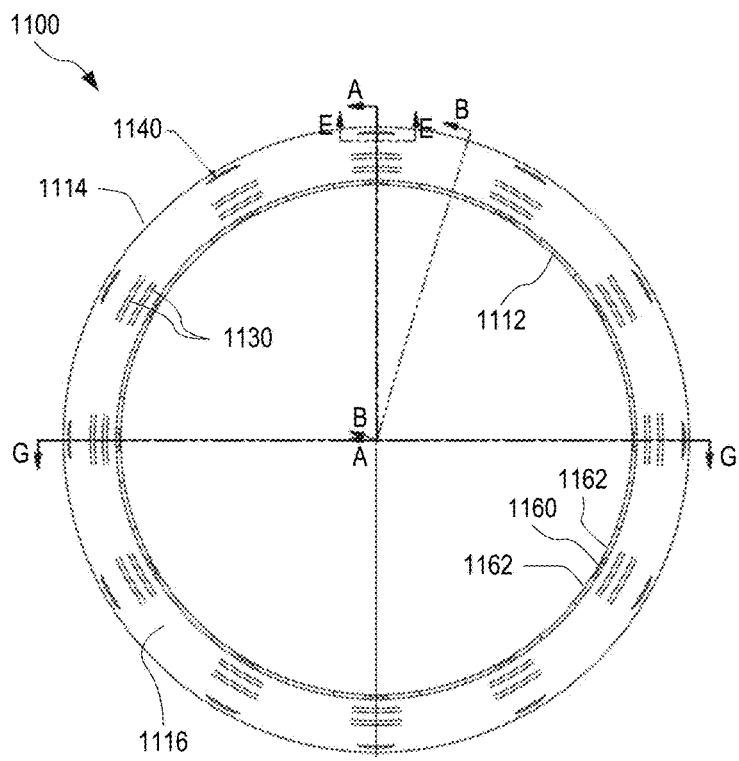
FIGS. 16A, 16B, and 17A-E show an embodiment of the slinger of FIG. 11 in further detail.
Figure 16B:
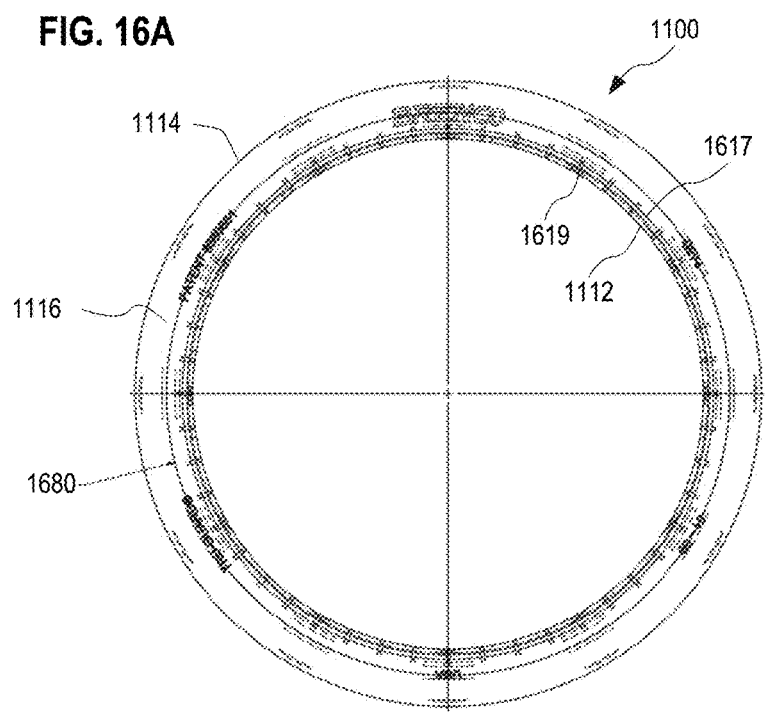
Figures 17A, 17B:
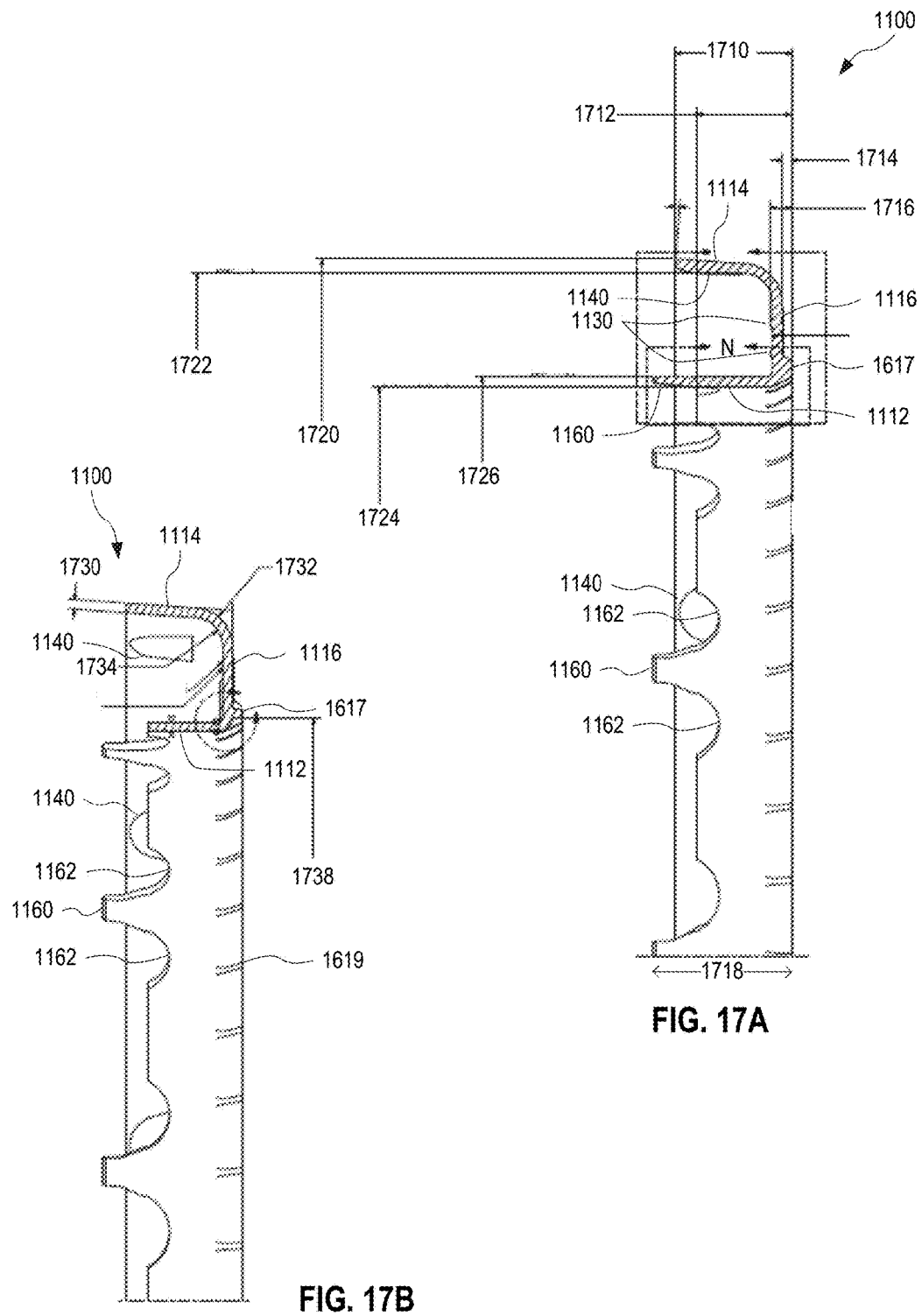
Figure 17C:
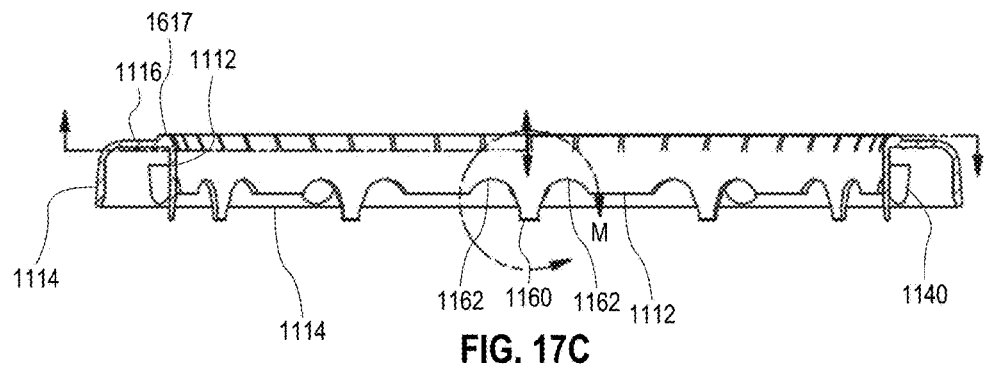
Figure 17D:
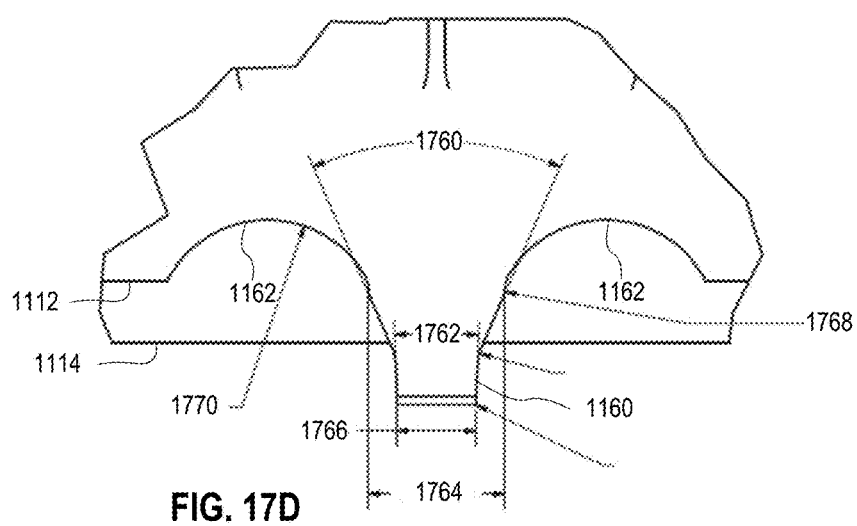
Figure 17E:
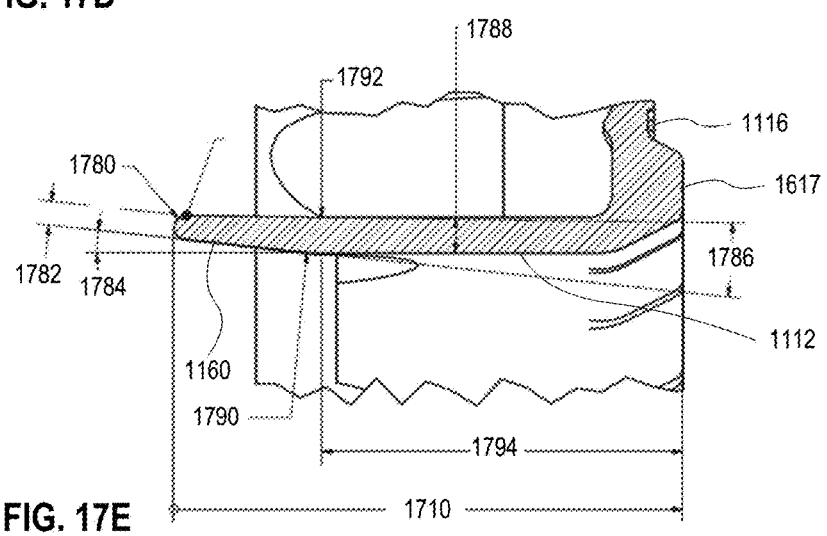

FIGS. 16A, 16B, and 17A-E show an embodiment of slinger 1100 in further detail. FIG. 16A shows an end view of slinger 1100, as viewed in the direction antiparallel to direction 280 (see FIG. 11), and FIG. 16B shows an end view of slinger 1100, as viewed along direction 280. FIG. 17A shows section A-A of slinger 1100. The location of section A-A is indicated in FIG. 16A. FIG. 17B shows section B-B of slinger 1100. The location of section B-B is indicated in FIG. 16A. FIG. 17C shows section G-G of slinger 1100. The location of section G-G is indicated in FIG. 16A. FIG. 17D shows a detail view M of a tab 1160 and adjacent stress-relieving recesses 1162. The location of section detail view M is indicated in FIG. 17C. FIG. 17E shows a detail view N of a tab 1160. The location of section detail view N is indicated in FIG. 17A. FIGS. 16A, 16B, and 17A-E are best viewed together.

FIG. 16B shows a guide ring 1617 of slinger 1100. Guide ring 1617 is an embodiment of guide ring 1017. Guide ring 1617 has a plurality of cuts 1619.

FIGS. 17A-E indicate dimensions of certain portions of slinger 1100. Dimension 1720 is the diameter of the outward facing surface of outer section 1114, dimension 1722 is the diameter of the inward facing surface of outer section 1114, in locations associated with features 1140, dimension 1724 is the diameter of the inward facing surface of inner section 1112, and dimension 1726 is the diameter of the outward facing surface of inner section 1112. Dimension 1738 is the inner diameter of guide ring 1617 in locations associated with cuts 1619. Dimension 1730 is the thickness of outer section 1114 in locations not associated with features 1140. Dimensions 1732 and 1734 are outer and inner radii of curvature of slinger 1110 at the transition from middle section 1116 to outer section 1114. Dimension 1710 is the projection, onto rotation axis 160, of the distance from the end of guide ring 1617 to the end of outer section 1114. Dimension 1712 is the projection, onto rotation axis 160, of the distance from the end of guide ring 1617 to the end of inner section 1112, in locations of inner section 1112 away from tabs 1160 and recesses 1162. Dimension 1714 is the distance by which guide ring 1617 protrudes from middle section 1116. Dimension 1716 is the projection, onto rotation axis 160, of the distance from the end of guide ring 1617 to the end of ribs 1130. Dimension 1718 is the projection, onto rotation axis 160, of the distance from the end of guide ring 1617 to the tip of tabs 1160. In one embodiment, dimensions 1720, 1722, 1724, 1726, 1738, 1730, 1732, 1734, 1710, 1712, 1714, 1716, and 1718 are 8.66", 8.48", 7.07", 7.19", 7.23", 0.06", 0.24", 0.18", 0.72", 0.58", 0.058", 0.133", and 0.86", respectively.

Dimension 1766 is the width of tab 1160 at its tip, and dimension 1764 is the width of tab 1160 at its base. Dimension 1762 is the angle by which tab 1160 widens near its tip, and dimension 1760 is the angle by which tab 1160 widens near its base. Dimension 1768 is the radius of curvature at the transition between tab 1160 and recess 1162. Dimension 1770 is the radius of curvature of recess 1162. Dimension 1780 is the radius of curvature of the tip of tab 1160. Dimension 1782 is the thickness of tab 1160 at its tip. Dimension 1784 is the angle by which the inward facing surface of tab 1160 angles away from rotation axis 160. Dimension 1786 is the angle between the inward and outward facing surfaces of tab 1160. Dimension 1788 is the thickness of inner section 1112 closer than tabs 1160 to middle section 1116. Dimensions 1790 and 1792 are radii of curvature at the deflection point at the base of tab 1160. Dimension 1716 is the projection, onto rotation axis 160, of the distance from the end of guide ring 1617 to the base of tab 1160. In one embodiment, dimensions 1766, 1764, 1762, 1760, 1768, 1770, 1780, 1782, 1784, 1786, 1788, 1790, 1792, and 1794 are 0.176", 0.304", 4°, 47°, 0.10", 0.25", 0.020", 0.040", 6°, 5°, 0.060", 0.260", 0.200", and 0.608", respectively.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A slinger for a roller bearing seal, comprising:
    an inner section extending at least in a first direction parallel to a rotation axis of the slinger, encircling the rotation axis and forming a plurality of tabs configured to pressure fit the slinger onto a rotor of a roller bearing seal, each of the tabs having an outward facing surface that (a) faces away from the rotation axis and (b) is configured to press against an inward facing surface of the rotor facing the cylinder axis,
    an outer section extending at least in the first direction at a greater distance than the inner section from the rotation axis and encircling the rotation axis; and
    a middle section encircling the rotation axis and spanning between the inner section and the outer section;
    wherein (a) the outward facing surface of each tab is angled away from the rotation axis such that distance from the rotation axis to the outward facing surface is less at a first location closer to the middle section than at a second location farther from the middle section, and (b) the inner section, the middle section, and the outer section define respective portions of a single continuous part.

2. The slinger of claim 1, the outward facing surface of each tab being angled further away from the rotation axis than the outward facing surface of portion of the inner section between the tabs and the middle section.

3. The slinger of claim 1, the tabs being flexible to enable said pressure fit.

4. The slinger of claim 1, the plurality of tabs being positioned at a respective plurality of azimuthal angles relative to the rotation axis.

5. The slinger of claim 4, adjacent each of the tabs, the inner section forming recesses, penetrating into the inner section in direction opposite the first direction, to reduce stress in the slinger when a roller bearing seal assembly incorporating the slinger and the rotor is integrated in a roller bearing.

6. The slinger of claim 5, for each of the tabs, one of the recesses being located adjacent the tab at a greater azimuthal angle than the tab and another one of the recesses being located adjacent the tab at a smaller azimuthal angle than the tab.

7. The slinger of claim 1 being composed of a polymer.

8. The slinger of claim 1 being integrally formed.

9. The slinger of claim 1, between the first location and the second location, the outward surface being at an angle to the rotation axis that is in the range between 0.5 and 1.5 degrees.

10. A roller bearing seal assembly forming a labyrinth seal, comprising:
    a seal case;
    a rotor coupled to the seal case to form a first portion of the labyrinth seal between the rotor and the seal case; and
    a slinger coupled to the rotor via a pressure fit between an inward facing surface of the rotor and a plurality of tabs of the slinger, the slinger and the rotor forming a second portion of the labyrinth seal therebetween.

11. The roller bearing seal assembly of claim 10 being a noncontact seal.

12. The roller bearing seal assembly of claim 10, the slinger further comprising features protruding into the labyrinth seal to enhance sealing capability.

13. The roller bearing seal assembly of claim 10, the seal case including an outer case and an insert positioned in the outer case, the rotor being coupled to the seal case via the insert.

14. The roller bearing seal assembly of claim 13, the first portion of the labyrinth seal being at least partly between the insert and the rotor.

15. The roller bearing seal assembly of claim 10, the slinger including:
- an inner section extending at least in a first direction parallel to a cylinder axis of the roller bearing seal assembly, the inner section forming the tabs;
- an outer section extending at least in the first direction at a greater distance than the inner section from the cylinder axis; and
- a middle section spanning between the inner section and the outer section.

16. The roller bearing seal assembly of claim 15, adjacent each of the tabs, the inner section forming recesses, penetrating into the inner section in direction opposite the first direction, to reduce stress in the slinger when the roller bearing seal assembly is integrated in a roller bearing.

17. The roller bearing seal assembly of claim 10, the inward facing surface of the rotor having a plurality of notches accommodating the plurality of tabs, respectively, for registering the slinger to the rotor and limiting rotation about the rotation axis of the slinger relative to the rotor.

18. The roller bearing seal assembly of claim 10, an inward facing surface of the slinger being pressure fit on a wear ring.

19. The roller bearing assembly of claim 10, the inward facing surface of the rotor being parallel to rotation axis of the roller bearing assembly.

20. A method for assembling at least a portion of a roller bearing, comprising:
- positioning a rotor in a seal case to form a first portion of a labyrinth seal; and
- pressure fitting a slinger onto the rotor by pressure fitting a plurality of tabs of the slinger onto an inward facing surface of the rotor, to form a second portion of the labyrinth seal.

21. The method of claim 20, the tabs being part of an inner section of the slinger extending at least in a first direction parallel to rotation axis of the rotor, the slinger further including (a) an outer section extending at least in the first direction at a greater distance than the inner section from the rotation axis and (b) a middle section spanning between the inner section and the outer section, the step of pressure fitting comprising positioning a portion of the seal case and a portion of the rotor between the inner and outer sections to form a labyrinth seal.

22. The method of claim 20, further comprising:
- inserting an insert into an outer case to form the seal case; and
- in the step of positioning the rotor in the seal case, mating the rotor to the insert.

23. The method of claim 22, the step of mating comprising at least partly forming the first portion of the labyrinth seal between the insert and the rotor.

24. The method of claim 20, further comprising:
- mounting the roller bearing seal assembly on a wear ring by pressing the wear ring into aperture formed by slinger, while the tabs keep the slinger secure on the rotor.

25. The method of claim 24, the tabs being part of an inner section of the slinger extending at least in a first direction parallel to rotation axis of the rotor, an inward facing surface of the inner section forming the aperture, and, prior to the step of mounting, the tabs being angled radially outward from the rotation axis to contact an inward facing surface of the rotor facing the rotation axis, wherein the step of mounting includes the wear ring pressing on the inner section to at least reduce the degree by which the tabs are angled radially outward.

26. The method of claim 25, the step of mounting comprising flattening the tabs against the inward facing surface of the rotor.

27. The method of claim 24, further comprising sliding the wear ring onto a journal.

28. The method of claim 20, the step of pressure fitting the slinger onto the rotor comprising registering the plurality of tabs to a corresponding plurality of notches in the inward facing surface of the rotor, the notches being configured to limit rotation about the rotation axis of the slinger relative to the rotor.

* * * * *

UNITED STATES PATENT AND TRADEMARK OFFICE
CERTIFICATE OF CORRECTION

PATENT NO. : 10,371,210 B2
APPLICATION NO. : 15/621898
DATED : August 6, 2019
INVENTOR(S) : James A. Hargraves et al.

Page 1 of 1

It is certified that error appears in the above-identified patent and that said Letters Patent is hereby corrected as shown below:

In the Claims

Claim 1, at Column 14, Line 14 "the rotor facing the cylinder axis," should read -- the rotor facing the rotation axis, --.

Signed and Sealed this
Tenth Day of November, 2020

Andrei Iancu
*Director of the United States Patent and Trademark Office*